Nov. 23, 1954 G. B. BUSH 2,695,358
BAND CENTERING AUTOMATIC FREQUENCY CONTROL
Filed April 3, 1952
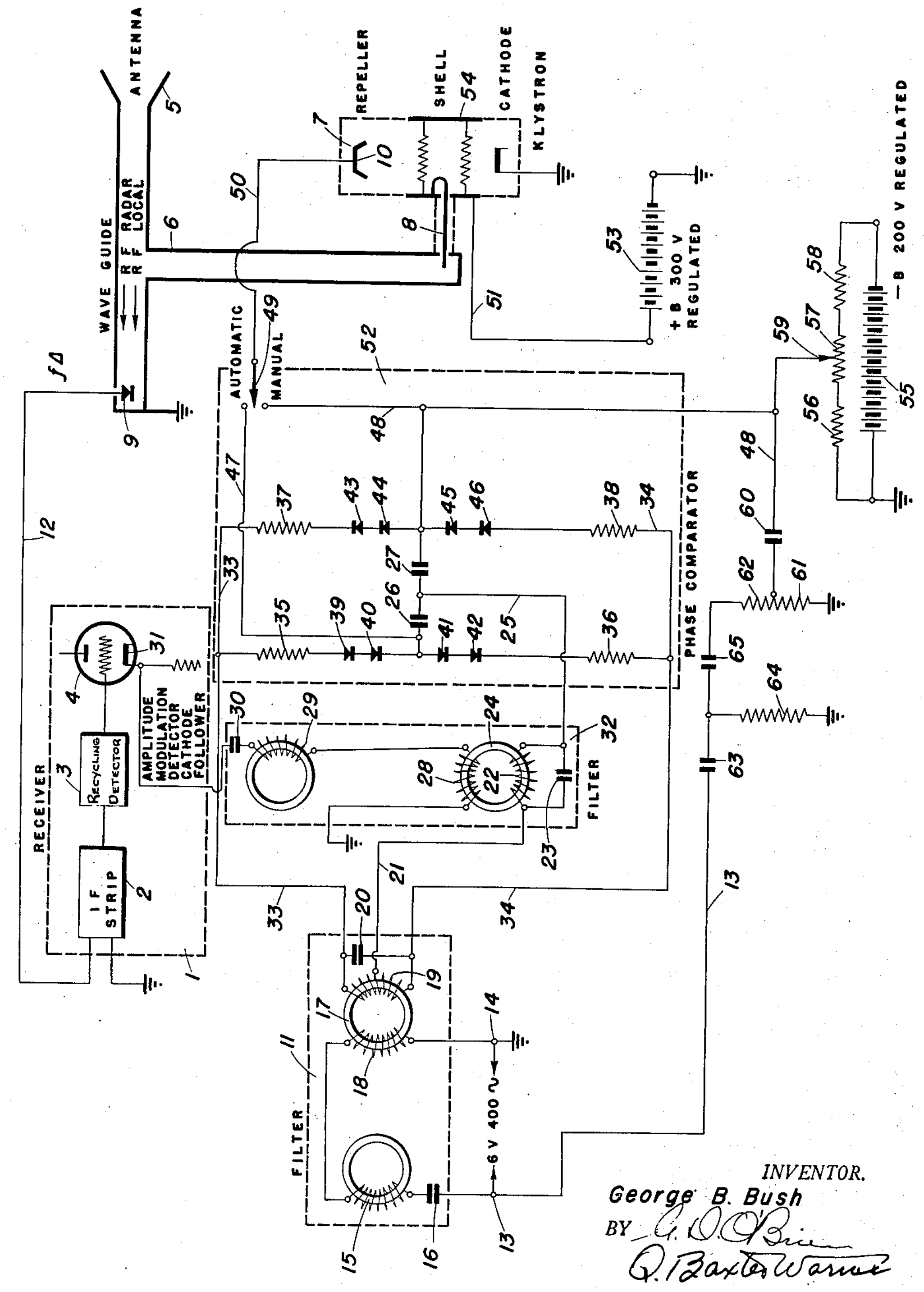
INVENTOR.
George B. Bush
BY G. O. O'Brien
Q. Baxter Warner
ATTORNEYS United States Patent Office
2,695,358
Patented Nov. 23, 1954

2,695,358

BAND CENTERING AUTOMATIC FREQUENCY CONTROL

George B. Bush, Silver Spring, Md., assignor to the United States of America as represented by the Secretary of the Navy Application April 3, 1952, Serial No. 280,350

2 Claims. (Cl. 250—20)

The present invention relates to an improved automatic frequency control for band-centering a superheterodyne radio circuit, whether continuous wave, pulsed or frequency-modulated.

Heretofore automatic frequency control has been obtained by the use of special added circuits which involved the provision of extra electronic tubes, with the result that an already excessive tube complement was increased.

One of the principal objects of the invention is, therefore, to provide a simplified automatic frequency control for a superheterodyne radio circuit of the type used in television receivers and in radar apparatus.

Another object is to provide fully automatic means for adjusting the frequency of the local oscillator of a superheterodyne receiver to a fixed difference from the received frequency, so as to maintain a constant intermediate frequency.

Other objects and many of the attendant advantages of the invention will be appreciated readily as the same becomes understood by reference to the following detailed description, when considered in connection with the accompanying drawings, wherein the single figure is a circuit diagram of the band-centering automatic frequency control constituting the present invention.

The feasibility of the invention is based upon the fact that frequency modulation of the output of a klystron, acting as a local oscillator, may be attained by varying the voltage of its repeller. In the system specifically disclosed hereinafter, a small alternating voltage drop, arbitrarily at a frequency of 400 cycles per second, is maintained across a resistor in the circuit. Whenever there is a frequency error, the detected signal will possess amplitude modulation at said 400 cycles per second, and for small errors in either direction from the correct center frequency this amplitude will be proportional to the tuning error, with phase reversal upon passing through the center frequency.

In the circuit specifically shown and described, the numeral 1 indicates the radio receiver to be controlled. It is of the superheterodyne type, and as such includes an intermediate frequency (I. F.) amplifier 2, briefly designated an I. F. strip. The output of this I. F. strip passes into a second detector 3, of the recycling type, and thence to the grid of a triode 4 connected in a cathode follower circuit. Recycling detectors are disclosed in the Radiation Laboratory Series (Massachusetts Institute of Technology), vol. 19 (Waveforms), pp. 508–511. The purpose of this cathode follower circuit is to provide a relatively low impedance device for matching the impedance of another part of the circuit, described below.

The input to the receiver 1 is derived from a radio frequency signal received by an antenna 5 connected to a suitable waveguide system 6 which is also coupled to a klystron 7, at 8. This klystron acts as a local oscillator, combining the frequency it generates with that received from a transmitter by the antenna 5. A first detector 9, mounted in the waveguide 6 and connected to one end of the I. F. strip 2 by conductor 12, converts, by the well known heterodyne action, to produce the I. F., amplified by the strip 2. As the band-center frequency of the signal received by the antenna may vary, means must be provided for producing a constant I. F. in spite of such variations. This is accomplished by varying the voltage of the repeller 10 of the klystron, by circuits to be described hereinbelow.

While the invention is here illustrated, purely by way of example, as applied to a 400 cycle system, it is to be understood that it is not limited to any specific frequency. 400 cycle current is, however, a standard frequency current commonly used in airplane electrical power systems and in guided missiles, and therefore has been selected here.

A filter circuit 11 is provided, into which electricity is fed at 6 volts, 400 cycles per second, between conductor 13 and ground 14. The filter 11 comprises essentially a series capacitor 16, an inductance 15 wound on a toroidal iron core, and the primary winding 18 of a transformer 17, which has a primary winding 18 and a secondary winding 19, wound on a toroidal core. An important feature of the filter input circuit is that the capacitor 16, inductance 15 and winding 18 should peak at the 400 cycle frequency of the power system, and it is largely immaterial what individual values of these components are used, provided the filter as a whole resonates at said frequency.

The transformer primary 18 serves the double purpose of providing a filter inductance and acting as a transformer input winding. However, due to losses in the filter, the six volts applied to the filter will drop to, say, four volts and this loss must be taken into account in the design of the circuit. The inductance ratio of windings 19 and 18 may be relatively large, so that considerable voltage increase is provided by the transformer 17, say 60 volts, center tapped. A suitable capacitor 20 is connected across the secondary winding 19 as shown.

The center tap 21 of this secondary winding 19 is connected through a secondary winding 22 of transformer 24, likewise of the toroidal core type, to the center tap 25 between two capacitors 26 and 27. Winding 22 is also shunted by a suitable capacitor 23 as shown. The transformer 24 has a primary winding 28, grounded at one end and connected at its other end to one end of an inductance 29 wound on a toroidal core, the other end of said inductance being connected through a capacitor 30 to the cathode 31 of the triode 4. The winding 28, inductance 29 and capacitor 30 constitute a second filter 32, likewise peaked at 400 cycles.

Across the outer leads 33 and 34 of winding 19 are bridged two series-connected strings of components, each string comprising two resistors and four rectifiers. Each such resistor, 35, 36, 37 and 38 may be of the order of a megohm, and the rectifiers may be very small selenium rectifiers, as they need not carry even as much as one milliampere. It should be noted that the rectifiers 39, 40, 41 and 42 of the first string are directed oppositely to the rectifiers 43, 44, 45 and 46 of the second string. Thus the current flow in the first string will be downward while that in the second string will be upward. Obviously the two strings jointly will present a balanced condition to the output or secondary winding 19 of transformer 17, so that this transformer alone will produce no residual potential difference between conductors 47 and 48. The elements 26, 27 and 33–50 inclusive form a "phase-sensitive rectifier" circuit, also known as a "phase comparator," and designated as a whole by reference character 52.

While, as stated, voltages originating in the secondary winding 19 of transformer 17 have no effect on the output of the phase sensitive rectifier 52, this is not true of transformer 24. The secondary winding 22 thereof is connected between the center tap of winding 19 and the center tap between capacitors 26 and 27 respectively. As to such connection, rectifiers 39 and 40 oppose rectifiers 41 and 42 while rectifiers 43 and 44 oppose rectifiers 45 and 46, so that rectified pulses will appear across conductors 47 and 48, when winding 22 furnishes an A. C. voltage.

A source of high voltage 53 shown as a 300 volt battery has its negative terminal grounded and its positive terminal connected through wire 51 to the shell 54 of the klystron 7. Additional voltage is supplied from the source 55, indicated as a 200 volt battery with its positive terminal grounded and having a voltage dividing resistor 56, 57, 58 connected across the entire battery. Advantageously, resistors 56 and 58 may be fixed "extender" resistors, while resistor 57 is provided with a variable tap 59 connected to conductor 48. It will be evident that voltage sources 53 and 55 are connected in series through their common grounds, and jointly maintain the repeller 10 highly negative to the klystron shell 54.

Conductor 48, besides leading into phase comparator 52, also connects through capacitor 60 to a fixed tap between resistors 61 and 62, which form part of another circuit as follows: Starting from conductor 13, the circuit leads through capacitors 63 and 65 in series to the upper end of resistor 62, with a resistor 64 connecting the tap between said capacitors 63 and 65 to ground. The resistance of resistor 61 may be of the order of one hundred ohms, while that of 62 will be relatively high, to that of the six volts applied between conductor 13 and the ground, an A. C. voltage drop in the neighborhood of less than one-tenth of one volt may appear across resistor 61.

The operation of the invention depends upon the fact that frequency modulation of the output of a klystron may be attained by varying the voltage of the repeller. In the circuit that has just been described, whereby upon suitable selection of the circuit components as suggested above, an A. C. voltage of approximately one-twelfth of a volt is maintained across resistor 61, the klystron output will have about ½ megacycle per second R. M. S. frequency modulation, sinusoidal, at 400 cycles per second.

Therefore, if the difference frequency between the central frequency of the received signal and the klystron frequency is not the desired I. F. frequency, which may be for example, 30 megacycles per second, the detected signal will have amplitude modulation at 400 cycles per second. For small deviations on each side of the correct center frequency, the 400 cycle amplitude modulation will be proportional to the tuning error, with a phase reversal in passing through said center frequency.

While the invention has been disclosed with particular reference to a klystron as the local oscillator, it is also possible to employ a conventional oscillator plus a conventional reactance tube in place of the klystron, whereby the reactance tube will yield variable frequency output when bias changes occur.

It will also be noted that while two filter circuits are disclosed, it is not always necessary to provide the "first" filter 11, whose primary function is to serve as a reference device. By reason of the general similarity of the two filters 11 and 32, any phase shift occurring in one is compensated by a similar shift in the other, and when this refinement is not required the first filter may be omitted.

The switch arm 49 may be placed in the "manual" or lower position while making any requisite preliminary adjustments of the system, whereupon it may be placed in its upper or "automatic" position and left there.

Obviously many modifications and variations of the present invention are possible in the light of the above teachings. It is therefore to be understood that within the scope of the appended claims, the invention may be practiced otherwise than as specifically described.

What is claimed is:

1. In a superheterodyne receiver system, an automatic frequency control, including a klystron oscillator having a repeller, means combining the oscillator output with the signal energy received to provide an intermediate-frequency signal, means including a receiver having a band pass amplifier, a source of A. C. voltage to provide frequency modulation by driving said oscillator repeller, and a phase comparator to measure the phase and amplitude of the resulting A. C. output of said receiver with respect to said A. C. voltage source, thereby deriving a unidirectional bias voltage proportional to the deviation from said frequency, a circuit applying said voltage to said repeller of said klystron to vary the frequency of the oscillations produced thereby to correct said deviation, and means including a pair of identical band pass filters which pass said A. C. source frequency, one of said filters being located between the output of said receiver and phase comparator and the other being located between said A. C. voltage source and phase comparator, whereby a phase shift in one filter due to a frequency source change is compensated by an identical phase shift in the other filter.

2. In a superheterodyne receiver system, an automatic frequency control, including a local oscillator having a bias-sensitive frequency controlling electrode, a receiver having a band pass amplifier, a source of periodic voltage to provide frequency modulation by driving said oscillator electrode, said voltage undergoing amplitude modulation as a result of the frequency modulation applied through said receiver, said amplitude modulation having phase and magnitude corresponding to the sense and amount of difference of the frequency of said local oscillator from its desired frequency, means including a phase comparator for deriving a D. C. control signal voltage whose polarity and magnitude correspond to said amplitude modulation, electronic means applying said D. C. control voltage to the controlling electrode to correct the said frequency difference, and means including a pair of identical band pass filters which pass said periodic source frequency, one of said filters being located between the output of said receiver and phase comparator and the other being located between said periodic voltage source and phase comparator, whereby a phase shift in one filter due to a frequency source change is compensated by an identical phase shift in the other filter.

References Cited in the file of this patent

UNITED STATES PATENTS

| Number | Name | Date |
|---|---|---|
| 1,712,051 | Round | May 7, 1929 |
| 2,058,411 | Carlson | Oct. 27, 1936 |
| 2,084,647 | MacDonald | June 22, 1937 |
| 2,428,265 | Crosby | Sept. 30, 1947 |
| 2,462,294 | Thompson | Feb. 22, 1949 |
| 2,462,857 | Ginzton et al. | Mar. 1, 1949 |
| 2,502,456 | Hansen et al. | Apr. 4, 1950 |
| 2,564,059 | Gensel | Aug. 14, 1951 |